3,419,626
CHLORO-SUBSTITUTED XYLYLENE
DIBROMIDES
William J. Pyne, Painesville, and Henry Bluestone, University Heights, Ohio, assignors to Diamond Shamrock Corporation, a corporation of Delaware
No Drawing. Filed Oct. 11, 1965, Ser. No. 494,943
1 Claim. (Cl. 260—651)

ABSTRACT OF THE DISCLOSURE

This invention relates to novel ring-chlorinated ortho- and para-xylylene dibromides which are prepared by reacting with the aid of actinic radiation and at a temperature ranging from about 25° to 100° C., the corresponding ring-chlorinated xylene isomers with bromine. These chlorinated xylylene dibromide isomers exhibit significant pesticidal activity.

---

This invention relates to the control of plant growth and various organisms such as bacteria, fungi and insects wherein chlorosubstituted xylylene dibromides are employed as active ingredients.

More particularly, the present invention relates to the use of novel chlorosubstituted xylylene dibromides having the following structure

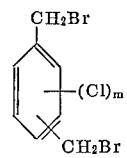

wherein m is an integer from 1 to 4, inclusive; any free bonds being satisfied by hydrogen.

Illustrative of specific compounds employed in the practice of the present invention are
4-chloro-m-xylylene dibromide

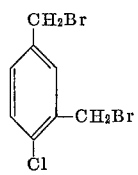

2-chloro-p-xylylene dibromide

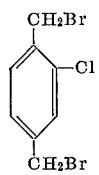

3,6-dichloro-o-xylylene dibromide

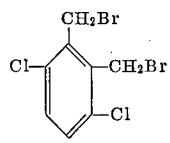

4,5-dichloro-o-xylylene dibromide

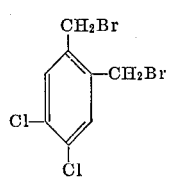

2,4-dichloro-m-xylylene dibromide

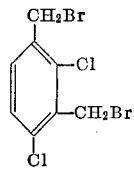

4,6-dichloro-m-xylylene dibromide

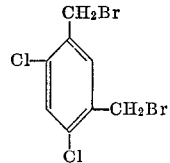

2,4,5,6-tetrachloro-m-xylylene dibromide

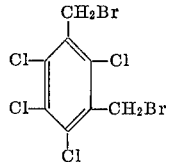

2,3-dichloro-p-xylylene dibromide

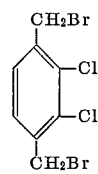

2,5,dichloro-p-xylylene dibromide

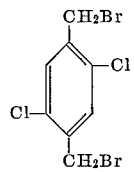

2,3,5-trichloro-p-xylylene dibromide

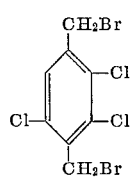

The compounds of the above structure are useful as chemical intermediates and are also effective as herbicides as well as pesticides for controlling fungi, bacteria and other organisms.

While it is possible to apply the compounds of the present invention in undiluted form to the plant or other material to be protected, it is frequently desirable to apply them in admixture with either solid or liquid inert, pesticidal adjuvants. Thus, these compounds can be applied to the plants for fungicidal purposes, for example, by spraying them with aqueous or organic solvent dispersions of the chemical. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, petroleum, naphtha; ketones such as acetone, methyl ethyl ketone and cyclohexanone; chlorinated hydrocarbons, such as carbon tetrachloride, chloroform, trichloroethylene, perchlorethylene; esters such as ethyl acetate, amyl acetate and butyl acetate; the monoalkyl ethers of ethylene glycol, e.g., the monomethyl ethers and the monoalkyl ethers of diethylene glycol, e.g., the monoethyl ether; alcohols such as ethanol, isopropanol and amyl alcohol, etc.

The xylylene dibromides of this invention can also be applied to plants and other materials along with inert solid pesticidal adjuvants or carriers such as talc, pyrophyllite, Attaclay, kieselguhr, chalk, diatomaceous earth, lime, calcium carbonate, bentonite, fuller's earth, cottonseed hulls, wheat flour, soybean flour, etc., pumice, tripoli, wood flour, walnut shell flour, and lignin.

It is frequently desirable to incorporate a surface active agent in the pesticidal compositions of this invention. Such surface active agents are advantageously employed in both the solid and liquid compositions. The surface active agent can be anionic, cationic, or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benzene sulfonates having 14 to 18 carbon atoms, alkyl-phenolethylene oxides, e.g., p-isooctyl phenol condensed with 10 ethylene oxide units; and soaps, e.g., sodium stearate and sodium oleate. A typical surface active agent is Aerosol OS (sodium salt of propylated naphthylenesulfonic acid).

The solid and liquid formulations can be prepared by any suitable method. Thus, the solid active ingredients, in finely divided form, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5 to 50% of the total by weight. However, concentrations outside this range are operative and compositions containing from 1 to 99% of active ingredient by weight are contemplated, the remainder being carrier and/or any other additive or adjuvant material which may be desired. It is often advantageous to add small percentages of surface active agents, e.g., 0.5 to 1% of the total compositions by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, 0.5 to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The novel xylylene dribomides of the present invention can be employed in compositions containing other pesticides, more especially fungicides and bactericides.

Generally, the compounds of this invention, i.e., the compounds within the scope of the generic structure above may be prepared by brominating the alkyl side-chain carbons of a ring-chlorinated xylene compound of the structure

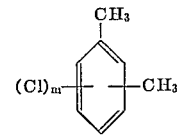

wherein $m$ is an integer from 1 to 4, inclusive, any free bonds being satisified by hydrogen. The ring-chlorinated xylenes which are brominated in the process of this invention may be prepared by reacting ortho-, meta-, or para-xylene with chlorine in the presence of a chlorination catalyst. These compounds are known materials which are available commercially or can be prepared at low cost.

The bromination reaction of the present invention is carried out in the presence of a source of actinic radiation such as a light having a wave-length shorter than 4785 A. In one method, the bromine which is usually in solution in an organic solvent, is introduced slowly into a solution of the ring-chlorinated xylene in a liquid hydrocarbon, especially a chlorinated hydrocarbon such as carbon tetrachloride, chloroform, chlorobenzene or the like. The bromine addition is effected in a time period of about 5 hours while maintaining the reaction mixture at a temperature ranging from about 23° to 70° C. Alternatively, the bromine may be added to the molten ring-chlorinated xylene in the absence of solvent, which addition is effected in 6 to 7 hours at a reaction temperature of 70° to 100° C. In either method, the bromine is usually employed equally or slightly in excess of a stoichiometric ratio to the chlorinated xylene, e.g., two mols of bromine to one mol of the chlorinated xylene.

It is to be noted that from the process as described above the crude reaction product contains a minor percentage of the desired chloro-substituted xylylene dibromide compound in admixture with a major percentage of a corresponding chloro-substituted compound which is less completely brominated, i.e., a methyl-chloro-benzyl bromide. By employing ratios of bromine to chlorinated xylene which are greater than 2:1, however, it is possible to prepare higher percentages of the xylylene dibromide product. A methyl-chloro-benzyl bromide compound prepared usually as an oil which is easily separated from the xylylene dibromide by vacuum distillation. The isolated dibromide is then purified by recrystallization from an organic solvent, such as an alcohol, e.g., ethanol, isopropanol; a hydrocarbon, e.g., pentane, n-hexane, n-heptane; or a chlorinated hydrocarbon such as carbon tetrachloride.

The xylylene dibromide compounds of this invention are solid compounds having melting points ranging generally from 53° to about 170° C. They are ordinarily less than 5% soluble in water and greater than 5% soluble in acetone, cyclohexanone and xylene.

In order that those skilled in the art may more completely understand the present invention and the preferred methods by which the same may be carried into effect, the following specific examples may be offered.

EXAMPLE 1

Preparation of 4,6-dichloro-m-xylylene dibromide

A one-liter, three-necked flask is equipped with a stirrer, a dropping funnel, a thermometer, and a G.E. mercury vapor lamp. 352 g. (2 mols) of 4,6-dichloro-m-xylene is placed in the flask and heated to its melting point, after which 320 g. (2 mols) of liquid bromine is added dropwise to the molten material over a period of 4 hours, while illuminated by a mercury vapor lamp. After all the bromine has been added, the mixture is stirred for an additional hour. The reaction mixture is then vacuum distilled to yield 368 g. (72%) of 4,6-dichloro-3-methylbenzyl bromide identified as $C_8H_7Br_1Cl_2$ by elemental analytical data as follows:

Actual percent by weight, C, 37.84; H, 2.76. Calculated percent by weight, C, 37.7; H, 3.0. The residual solid remaining in the distillation flask is recrystallized twice from isopropyl alcohol to yield 56 g. (8.3% yield) of a white solid melting at 68° C. This solid is indicated to be $C_8H_6Br_2Cl_2$ by elemental analytical data as follows:

Actual percent by weight, C, 29.1; H, 1.8. Calculated percent by weight, C, 28.9; H, 1.8.

Vapor phase chromatographic analysis of this product shows this material to have two retention peaks in a ratio of about 80% to 20%. It is believed that the lesser peak indicates the presence of another possible isomer, a,a - dibromo - 4,6 - -dichloro-m-xylene, in admixture with the 4,6-dichloro-m-xylylene dibromide and having the same empirical formula. Hydrolysis of such an isomeric mixture should yield 4,6-dichloro-m-xylylene diol and 2,4-dichloro-5-methylbenzaldehyde.

EXAMPLES 2–4

Following the general procedure as outlined in Example 1, xylylene dibromide compounds of this invention are prepared. In each example, equimolar proportions of bromine and the ring-chlorinated xylene compound are employed. Also, in each example, the oily product fraction containing a methyl - dichloro - benzyl bromide is removed from the reaction mixture by vacuum distillation. The desired xylylene dibromide is recovered from the residue remaining after distillation by recrystallization from an organic solvent. The results are as follows:

TABLE I

| Example | Reactant | Product | M.P., °C | Elemental Analysis Actual percent by weight | Calculated percent by weight |
|---|---|---|---|---|---|
| 2 | 2,3-dichloro-p-xylene | 2,3-dichloro-p-xylylene dibromide | 120–121 | C, 28.9 H, 1.8 | 28.9 1.8 |
| 3 | 4,5-dichloro-o-xylene | 4,5-dichloro-o-xylylene dibromide | 60 | C, 29.2 H, 1.9 | 28.9 1.8 |
| 4 | 3,6-dichloro-o-xylene | 3,6-dichloro-o-xylylene dibromide | 97–97.5 | C, 29.3 H, 1.9 | 28.9 1.8 |

EXAMPLE 5

Preparation of 2,5-dichloro-p-xylylene dibromide

Into a three-necked, round bottom, one-liter flask, equipped with stirrer, dropping funnel, and G.E. mercury vapor light is placed 88 g. (0.5 mol) of 2,5-dichloro-p-xylene in 300 ml. of dry carbon tetrachloride ($CCl_4$). To this mixture is added dropwise 160 g. (1 mol) of liquid bromine dissolved in 100 ml. of carbon tetrachloride. The mixture is kept between 50° and 70° C. by allowing cold water to run over the reaction flask. After all the bromine has been added, the solution is stirred an additional hour, while continuing illumination from the mercury vapor lamp. The solution is then cooled and the solvent distilled at reduced pressure. The residual solid is recrystallized from n-hexane to give 100 g. (60% yield) of a white solid, melting at 124° to 125° C., which is indicated as $C_8H_6Br_2Cl_2$ by the following elemental analytical data:

Actual percent by weight, C, 28.8; H, 2.00. Calculated percent by weight, C, 28.7; H, 1.80.

EXAMPLES 6–10

Using the same general procedure as outlined in Example 5, chlorosubstituted xylylene dibromides are prepared in carbontetrachloride solution as shown in the following table:

| Example | Product | Reactant | Reaction temperature, °C. | M.P. product, °C. | Elemental analysis Actual percent by weight | Calculated percent by weight |
|---|---|---|---|---|---|---|
| 6 | 2,3,5-trichloro-p-xylylene dibromide | 2,3,5-trichloro-p-xylene | 50 | 107–107.5 | C, 26.2 H, 1.4 | 26.2 1.37 |
| 7 | 2-chloro-p-xylylene dibromide | 2-chloro-p-xylene | 30–35 | 91–91.5 | C, 32.4 H, 2.5 | 32.2 2.4 |
| 8 | 4-chloro-m-xylylene dibromide | 4-chloro-m-xylene | 30–35 | 54–54.5 | C, 32.5 H, 2.7 | 32.2 2.4 |
| 9 | 2,4-dichloro-m-xylylene dibromide | 2,4-dichloro-m-xylene | 23–25 | 53–54 | C, 29.2 H, 2.1 | 29.0 1.8 |
| 10 | 2,4,5,6-tetrachloro-m-xylylene dibromide | Tetrachloro-m-xylene | 50 | 166–167 | C, 24.2 H, 1.1 | 23.9 1.0 |

EXAMPLE 11

Compounds of this invention are examined for ability to inhibit the growth of four bacterial species *Erwinia amylovora* (E.a.), *Xanthomonas phaseoli* (X.p.), *Micrococcus pyrogenes* var. *aureus* (M.a.) and *Escherechia coli* (E.c.) at various concentrations. For each compound, the basic test formulation contains 0.1 g. of the test chemical, 4 ml. acetone, 2 ml. stock emulsifier solution (0.5% Triton X–155 in water by volume) and 74 ml. distilled water, the concentration of toxicant in this formulation being 1250 parts per million. Lower concentrations of toxicant are obtained by diluting the basic formulation with distilled water. All of the bacterial species are cultured on nutrient agar slants except *X. phaseoli* which is grown on potato dextrose agar.

The cultures used for testing are subcultured for two sequential 24-hour periods to insure uniform test populations. Bacterial suspensions are made from the second subculture in the culture tube by addition of distilled water and gentle agitation, after which they are filtered through double layers of cheesecloth and adjusted to standard concentrations by turbidimetric measurement. Each of four test tubes arranged in a rack receive one ml. of the 1250 p.p.m. test formulation. After the test formulations have been measured into a test tube, 3½ ml. of distilled water and ½ ml. of bacterial suspension for each respective test organism is added to each test tube. The medication tubes are then set aside at room temperature for four hours. After this exposure period, transfers are made by means of a standard 4 mm. platinum loop to 7 ml. of sterile broth. The broth tubes are then incubated for 48 hours at 29° to 31° C., at which time bacterial growth is determined by turbidimetric measurement. A reading is recorded for each test tube after shaking. Three replicates of each organism serve as controls. Comparative growth calculations are made on the percent of the mean check reading. This value, subtracted from 100, gives percent control as compared to checks. Using this procedure, the following results are obtained:

tilled water is applied at concentrations up to 2000 p.p.m. of the test chemical. Lower concentrations of toxicant are

| Compound | Concentration (p.p.m.) | Percent control | | | |
|---|---|---|---|---|---|
| | | E.a. | X.p. | M.a. | E.C. |
| 4,6-dichloro-m-xylylene dibromide (product of Example 1). | 250 | 100 | 100 | 100 | 17 |
| | 100 | 100 | 86 | 100 | 17 |
| | 32 | 100 | 79 | 100 | 20 |
| | 16 | 100 | | 100 | |
| 4-chloro-m-xylylene dibromide (product of Example 8). | 100 | 100 | 100 | 100 | 100 |
| | 64 | 100 | 100 | 100 | 57 |
| | 32 | 100 | 100 | 100 | 43 |
| | 16 | 100 | 100 | 33 | 50 |
| 4,5-dichloro-o-xylylene dibromide (product of Example 3). | 250 | 100 | 90 | 100 | 25 |
| | 100 | 100 | 71 | 100 | 36 |
| | 64 | 73 | 69 | 100 | 0 |
| 2,4-dichloro-m-xylylene dibromide (product of Example 9). | 250 | 100 | 100 | 24 | 47 |
| | 100 | 100 | 0 | 100 | 0 |

EXAMPLE 12

This test measures the ability of compounds of this invention to inhibit spore germination on glass slides by the test tube dilution method as adopted from the procedure recommended by the American Phytopathological Society's Committee on Standardization of Fungicidal Tests. In this screen, chemicals at 1000, 100, 10 and 1.0 p.p.m. are tested for ability to inhibit germination of spores from 7- to 10-day-old cultures of *Alternaria oleracea* Mil. and *Monilinia fructicola* (Wint.) Honey. These concentrations refer to the actual concentrations after diluting the test preparations with spore stimulant and spore suspension. A formulation containing the test compound, acetone, stock emulsifier solution and distilled water is used for this test. The concentration of toxicant in this formulation is 1250 parts per million. The concentrations given above are diluted from this original formulation and the concentration of emulsifier and acetone is not maintained. Germination records are taken after 20 hours of incubation at 22° C. by observing several microscope fields so that at least 100 spores of each fungus have been examined at each concentration. Copper sulfate is used as a standard reference material. Test compounds are given alphabetical ratings which correspond to the concentration that inhibits germination of half the spores (ED50) in the test drops: AAA=0.01 to 0.1 p.p.m.; AA=0.1 to 1.0 p.p.m.; A=1.0 to 10 p.p.m.; B=10 to 100 p.p.m.; C=100 to 1000 p.p.m.; and D=1000 p.p.m. Using this procedure, the following results were obtained:

Compound tested: Rating
- 4,6-dichloro-m-xylylene dibromide ≧AA
- 4-chloro-m-xylylene dibromide ≧AA
- 2,4-dichloro-m-xylylene dibromide ≧AA
- 2-chloro-p-xylylene dibromide (product of Example 7) ≧AA
- 2,5-dichloro-p-xylylene dibromide (product of Example 5) ≧AA
- 3,6-dichloro-o-xylylene dibromide (product of Example 4) ≧AA
- 2,3-dichloro-p-xylylene dibromide (product of Example 2) ≧AA
- 4,5-dichloro-o-xylylene dibromide ≧AA
- 2,3,5-trichloro-p-xylylene dibromide (product of Example 6) ≧A

EXAMPLE 13

The tomato foliage disease test measures the ability of the test compound to protect tomato foliage against infection by the early blight fungus *Alternaria solani* (Ell. and Mart.) The method used employs tomato plants, 5 to 7 inches high which are 4 to 6 weeks old. Duplicate plants, one set for each test fungus, are sprayed with various dosages of the test formulation at 40 lbs./sq. in. air pressure while being rotated on a turntable in a hood. The center of the turntable is 45 inches from the nozzle of the spray gun. The test formulation containing the test compound, acetone, stock emulsifier solution and disobtained by employing less toxicant and more water, thereby maintaining the same concentration of acetone and emulsifier.

After the spray deposit is dry, treated plants and controls (sprayed with formulation less toxicant) are sprayed while benig rotated on a turntable with a spore suspension containing approximately 20,000 conidia of *A. solani* per ml. The atomizer used delivers 20 ml. in the 30-second exposure period. The plants are held in a saturated atmospere for 24 hours at 70° F. to permit spore germination and infection before removal to the greenhouse.

After two days from the start of the test for early blight lesion counts are made on the three uppermost fully expanded leaves. The data are converted to percent disease control based on the number of lesions obtained on the control plants. Dosages and percent disease control are given in the following table:

| Compound | Dosage concentration, (p.p.m.) | Percent disease control |
|---|---|---|
| 2-chloro-p-xylylene dibromide | 400 | 80 |
| | 128 | 85 |
| | 64 | 55 |
| 2,3,5-trichloro-p-xylene dibromide | 400 | 95 |
| | 256 | 61 |
| | 128 | 19 |
| | 64 | 6 |
| 2,5-dichloro-p-xylylene dibromide | 2,000 | 99 |
| | 400 | 70 |
| 3,6-dichloro-o-xylylene dibromide | 1,000 | 82 |
| | 200 | 65 |
| 2,3-dichloro-p-xylylene dibromide | 2,000 | 100 |
| | 400 | 73 |
| 2,4-dichloro-m-xylylene dibromide | 1,000 | 94 |
| | 256 | 45 |

EXAMPLE 14

Using the test procedure as outlined in Example 13, compounds of this invention are tested for their ability to protect tomato foliage against infection by the late blight fungus *Phytophthora infestans* (Mont.) deBary. During the test, the treated plants and controls are sprayed with a spore suspension containing approximately 150,000 Sporangia of the late blight fungus per ml. After spraying, the plants are maintained in a saturated atmosphere for 24 hours at 60° F. to permit spore germination and infection before transfer to the greenhouse. After three days from the start of the test, lesion counts are made on the plants as described in Example 13. Dosages of chemical and percent disease control determined are as follows:

| Compound | Dosage concentration, (p.p.m.) | Percent disease control |
|---|---|---|
| 2-chloro-p-xylylene dibromide | 400 | 100 |
| 2,3,5-trichloro-p-xylylene dibromide | 512 | 100 |
| | 256 | 55 |
| 2,4-dichloro-m-xylylene dibromide | 1,000 | 100 |
| | 200 | 99 |

EXAMPLE 15

To measure the ability of compounds of this invention to inhibit the germination of sclerotia of *Sclerotium*

*rolfsii*, black blotting paper pads (2 x 2 inches) are placed in a 200 p.p.m. formulation, diluted from a basic formulation containing 0.4 g. of test compound, 8 ml. acetone, 4 ml. stock emulsifier solution (0.5% Triton X-155 in water by volume) and 187.6 ml. distilled water. The concentration of toxicant in the basic formulation is 2000 parts per million. Lower concentrations of toxicant are obtained by diluting the formulation with distilled water. Each pad retains 2 ml. of test formulation, therefore, for the 200 p.p.m. formulation, approximately 400 mg. of chemical is impregnated on or adheres to each pad. Control pads are impregnated with water in the same manner. Twenty sclerotia are evenly placed on each pad which is then inserted into an 8-ounce wide-mouthed screw-cap bottle on a wire screen which is cut to rest in the middle of the bottle. The cap is replaced to retain a moist atmosphere and the bottle is placed in a horizontal position. After 48 hours at room temperature inhibition of germination is recorded by classes as follows: 0=complete inhibition, 1=slight growth, 2=moderate growth, 3= heavy growth equal to controls. The inhibition index is calculated in the following manner:

$$\text{inhibition index} = \frac{\text{Sum of products of number of sclerotia in each class} \times \text{respective class value} \times 100}{3 \times \text{total number of sclerotia}}$$

The inhibition index value is reported as a control index where 0 indicates no biological activity and 100 equals complete inhibition of sclerotial germination. Using this procedure, the following results are obtained:

| Compound | Concentration mg. | Inhibition of *Sclerotium rolfsii* germination |
| --- | --- | --- |
| 4,6-dichloro-m-xylylene dibromide. | 400 | 100 |
|  | 200 | 67 |
| 4,5-dichloro-o-xylylene dibromide. | 400 | 92 |
|  | 200 | 67 |
| 2,4-dichloro-m-xylylene dibromide. | 400 | 90 |
| 3,6-dichloro-o-xylylene dibromide. | 200 | 83 |

EXAMPLE 16

The following test measures the ability of compounds of this invention to inhibit mycelial growth in soil. Pasteurized soil is infested with *R. solani*, grown on a mixture of corn meal and sand contained in 16-oz. jars. The desired inoculum level is achieved by adding a number of jars of the corn meal-sand culture to a level flat of soil. The inoculum and soil are then intimately mixed and placed in suitable containers. Treatment of the soil is accomplished by drenching an appropriate amount of a diluted formulation containing the test compound, acetone, stock emulsifier solution and distilled water on the surface of the soil in the test container. For example, 19.9 ml. of a 1000 p.p.m. formulation, drenched on soil in a 4-oz. squat Dixie cup is equivalent to a dosage of 48 pounds per acre. The concentration of toxicant in this formulation is up to 2000 parts per million. Lower concentrations of toxicant are obtained by diluting the formulation with distilled water.

After drenching the containers are placed in a high humidity chamber at 70° F. for 48 hours. By this time the fungus mycelium has completely overgrown the surface of the soil in the control containers. Inhibition of mycelial growth is estimated on a scale from zero, complete inhibition of growth, to ten which is equivalent to controls. These grades are expressed as percent control. Using this procedure, the following results are obtained:

| Compound | Concentration, lbs./acre | Percent control |
| --- | --- | --- |
| 3,6-dichloro-o-xylylene dibromide | 32 | 100 |
|  | 5 | 50 |
| 2,4-dichloro-m-xylylene dibromide | 64 | 90 |
|  | 2 | 50 |
| 4,5-dichloro-o-xylylene dibromide | 64 | 100 |
|  | 32 | 95 |
|  | 16 | 20 |
| 4,6-dichloro-m-xylylene dibromide | 64 | 100 |
|  | 21 | 50 |

EXAMPLE 17

To evaluate the post-emergence activity of 2,4-dichloro-m-xylylene dibromide applied to the foliage of seedling plants, as well as to the soil in which they are growing, two mixtures of seeds are planted in sterilized composted greenhouse soil. One seed mixture contains three broadleaf (buckwheat, turnip and aster) and the other contains three grass species (sorghum, Italian millet and the perennial ryegrass). The soil is divided diagonally into two equal areas, and the broadleaves are seeded into one of these areas and the grasses into the other. The seeds are then covered uniformly with about ¼-inch of soil and watered, after which they are removed to the greenhouse and the test species are allowed to grow until one true leaf is present on the slowest growing broadleaf. This requires between 9 to 14 days depending upon the time of the year. When the plants (seedlings) have reached this stage of development the containers are sprayed at 10 p.s.i., uniformly covering the surface of the soil and the foliage with 40 ml. of test formulation at a dosage of up to 24 pounds per acre. Formulation contains the toxicant, equal volumes of water and acetone and 2 drops of Triton X-155.

Two weeks after treatment percent control is estimated and information on phytotoxicity, growth regulation, and other effects are recorded. Using this procedure, 2,4-dichloro-m-xylylene dibromide shows the following activity:

| Concentration, lbs./acre | Percent control | |
| --- | --- | --- |
|  | Broadleaf weeds | Grassy weeds |
| 24 | 99 | 95 |
| 12 | 99 | 85 |
| 6 | 40 | 25 |

EXAMPLE 18

To measure the growth regulating efficiency of compounds of this invention when applied to the foliage of growing plants, test solutions are prepared containing cyclohexanone, a stock emulsifier solution, distilled water and the test chemical at a concentration up to 4800 p.p.m. Lesser quantities of chemical are used when more dilute formulations are desired. Tomato plants (var. Bonny Best), 5 to 7 inches tall; field corn (var. Cornell M-1), 4 to 6 inches tall; beans (var. Tendergreen), just as the trifoliate leaves are beginning to unfold; and oats (var. Gary), 3 to 5 inches tall, are sprayed with the test formulation. The test plants are all sprayed simultaneously with 80 ml. of the test formulation at 40 pounds per square inch air pressure, while being rotated on a turntable in a spray hood. After the plants are dried they are removed to the greenhouse. Records are taken 14 days after treatment. Phytotoxicity is rated on the scale from 0, indicating no plant injury, to 11, plant kill and, additionally, stunting of the plant is rated on a scale of 1 to 9. Other responses such as formative effects, defoliant activity, growth regulant properties, and the like are also recorded. Using this procedure, the following results are obtained:

| Compound | Concentration, p.p.m. | Phytotoxicity rating | | | |
|---|---|---|---|---|---|
| | | Tomato | Beans | Corn | Oats |
| 3,6-dichloro-m-xylylene dibromide | 2,400 | 9 St 9 | 11 | 6 St 9 | 6 |
| 4,5-dichloro-o-xylylene dibromide | 2,400 | 4 | 10 | 4 | 5 |
| 2,4-dichloro-m-xylylene dibromide | 2,400 | 5 St 9 | 10 | 4 | 2 |
| 2-chloro-p-xylylene dibromide | 4,800 | 11 | 11 | 5 | 5 |
| | 2,400 | 11 | 9 Fe De | 2 | 4 |
| | 1,200 | 11 | 8 Fe | 2 | 4 |
| 4-chloro-m-xylylene dibromide | 4,800 | 11 | 11 | 11 | 9 |
| | 2,400 | 11 | 10 | 4 St 4 | 3 St 4 |
| | 1,200 | 9 St 8 | 10 St 8 Fe De | 2 | 1 |

St=stunting.
Fe=formative effects.
De=defoliation.

EXAMPLE 19

To measure the growth regulating efficiency of 3,6-dichloro-m-xylylene dibromide when applied to the foliage of growing plants, test solutions are prepared containing cyclohexanone, a stock emulsifier solution, distilled water and an appropriate concentration of test chemical. Lesser quantities of chemical are used when more dilute formulations are desired. Cotton plants, 50 to 90 days old depending on the season of the year, three plants for each treatment with 6 to 10 leaves per plant are sprayed with the test formualtion. The test plants are all sprayed simultaneously with 80 ml. of the test formulation at 40 pounds per square inch air pressure, while being rotated on a turntable in a spray hood. After the plants are dried, they are removed to the greenhouse. Leaf counts and phytotoxicity ratings of remaining leaves are taken 14 days after treatment. Phytotoxicity is rated on the scale from 0, indicating no plant injury, to 11, plant kill. Using this procedure, the following results are obtained:

| Concentration of chemical, p.p.m. | Percentage defoliation | Phytotoxicity rating |
|---|---|---|
| 2,400 | 34 | 3 |
| 1,200 | 11 | 1 |

EXAMPLE 20

This test determines the insecticidal activity of the compound being tested against the red spider mite, Tetranychus sp.

The shock culture of mites is maintained on bean foliage, being transferred from the stock culture, approximately 18 and 24 hours before testing, by pieces of infested leaves which are placed on the primary leaves of two Lima bean plants grown in 2½-inch pots. As the leaf fragments dry, the mites migrate to the uninfested leaves. Immediately before spraying, the leaf fragments are removed from the foliage. The freshly infested plants are then sprayed with the test formulation, which contains the test chemical, acetone, stock emulsifier solution and distilled water. The concentration of toxicant in this formulation is up to 2000 parts per million. Lower concentrations of toxicant are obtained by diluting the formulation with distilled water. After two days, two of the four leaves treated are examined under the binocular stereoptic microscope and the mortality determined. Should the compound be an effective miticide, the other two leaves are available to obtain information on the residual activity of this chemical. Results of insecticidal activity are given in the following table:

| Compound tested | Concentration, p.p.m. | Percent mortality |
|---|---|---|
| 4,6-dichloro-m-xylylene dibromide | 500 | 89 |
| | 250 | 61 |
| 4,5-dichloro-o-xylylene dibromide | 500 | 85 |

EXAMPLE 21

This test determines the insecticidal activity of compounds of this invention against houseflies, Musca domestica.

The formulation for this test contains 0.4 g. of test compound, 8 ml. acetone, 4 ml. stock emulsifier solution (0.5% Triton X–155 in water by volume) and 187.6 ml. of a ten-percent sugar solution. The concentration of toxicant in this formulation is up to 1000 p.p.m., with lower concentrations being obtained by diluting the formulation with distilled water. The chemical is formulated in a 125-ml. Erlenmeyer flask, adult houseflies (male and female), anesthetized with carbon dioxide, being placed therein and the flask is swirled, wetting the flies with the formulation. The contents of the flask are quickly poured onto a copper wire screen which retains the flies, but permits the formulation to pass through to a beaker where it is available for further testing. The flies are drained a few seconds and then transferred to a 5-oz. Dixie cup containing a disc of 7 cm. Whatman No. 1 filter paper; the cup is immediately covered with a Petri dish lid. The filter paper used is pre-treated by soaking it in a 10-percent sucrose solution and drying it and thereby it serves two purposes in the Dixie cup, a source of needed nutrition and absorption of excess formulation from the bodies of the flies. Mortality is determined one day after treatment. Results of insecticidal activity are given in the following table:

| Compound tested | Concentration, p.p.m. | Percent mortality |
|---|---|---|
| 4,5-dichloro-o-xylylene dibromide | 1,000 | 100 |
| | 500 | 90 |
| | 250 | 70 |
| 2,4-dichloro-m-xylylene dibromide | 1,000 | 100 |
| | 500 | 90 |
| 4,6-dichloro-m-xylylene dibromide | 1,000 | 100 |
| | 500 | 80 |

It is to be understood that although the invention has been described with specific reference to particular embodiments thereof, it is not to be so limited, since changes and alterations therein may be made which are within the full intended scope of this invention as defined by the appended claim.

What is claimed is:
1. 3,6-dichloro-o-xylylene dibromide.

References Cited

UNITED STATES PATENTS

| | | | |
|---|---|---|---|
| 2,412,389 | 12/1946 | Cass | 260—651 |
| 2,564,214 | 8/1951 | Ross et al. | 260—611 |
| 2,600,691 | 6/1952 | Ross et al. | 260—651 XR |
| 2,631,168 | 3/1953 | Ross et al. | 260—651 XR |
| 2,702,825 | 2/1955 | Ross et al. | 260—651 XR |
| 2,965,682 | 12/1960 | Horvath | 260—651 |
| 3,285,729 | 11/1966 | Weil | 260—651 XR |

(Other references on following page)

OTHER REFERENCES

Ross et al.: V, J. Org. Chem., vol. 25, pp. 2102–2105, 1960.

Lyon et al.: J. Chem. Soc., 1947, p. 668.

LEON ZITVER, *Primary Examiner.*

H. T. MARS, *Assistant Examiner.*

U.S. Cl. X.R.

71—70, 76, 126; 167—30; 204—163